Dec. 5, 1961 E. H. JOHNSON 3,011,805
PIPE COUPLING WITH CAM LEVER ACTUATED LATCH
FOR WATER TEST FIXTURE
Filed June 4, 1958 2 Sheets-Sheet 1
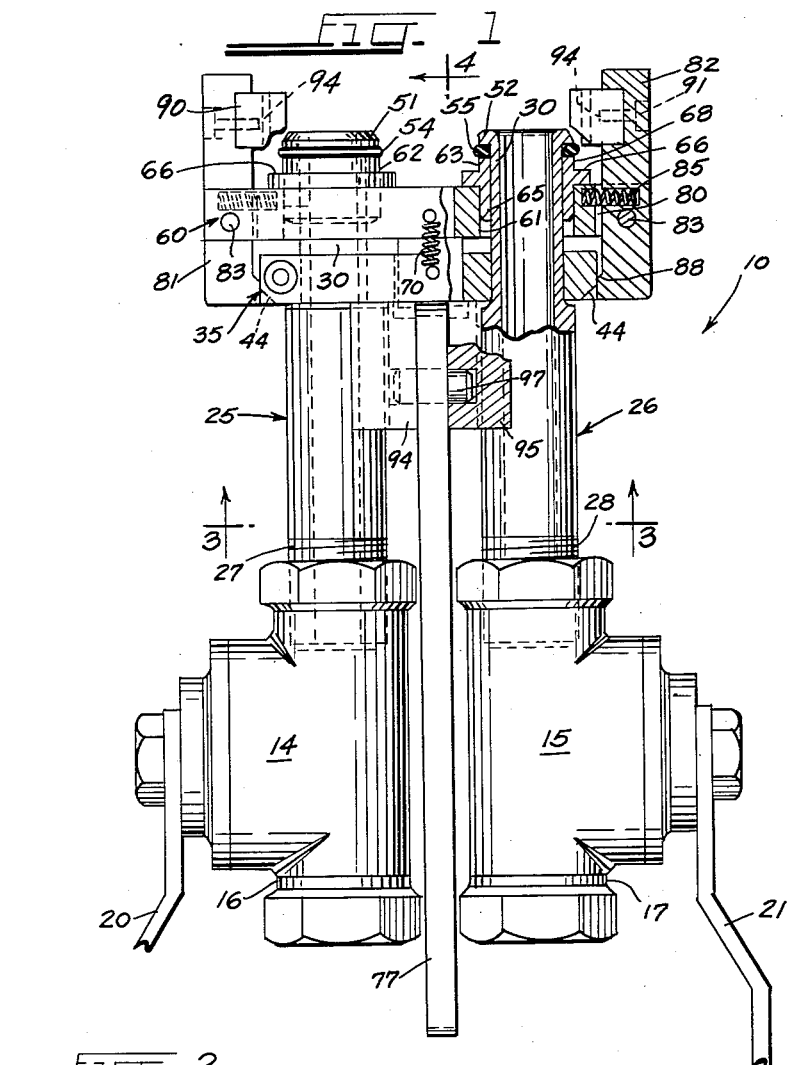
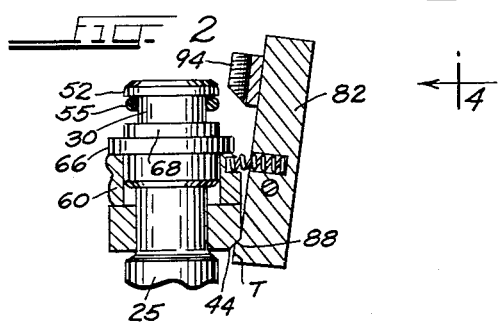
INVENTOR.
EDWIN H. JOHNSON
BY
Wallace and Cannon
ATTYS.

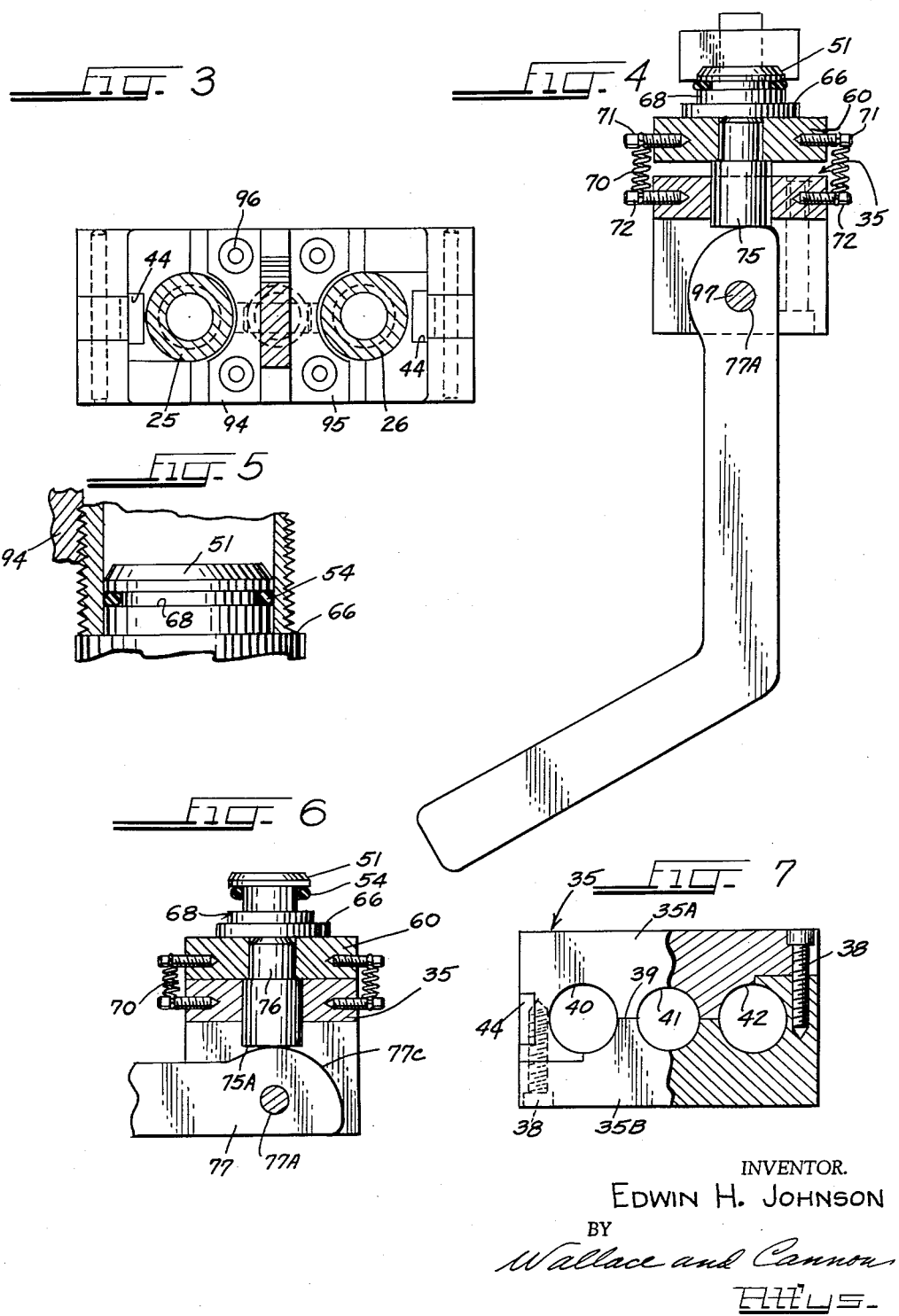

United States Patent Office 3,011,805
Patented Dec. 5, 1961

3,011,805
PIPE COUPLING WITH CAM LEVER ACTUATED
LATCH FOR WATER TEST FIXTURE
Edwin H. Johnson, Dayton, Ohio, assignor to Landor
Incorporated, Dayton, Ohio, a corporation of Ohio
Filed June 4, 1958, Ser. No. 739,709
2 Claims. (Cl. 285—137)

This invention relates to a water test fixture or coupler device for accomplishing quick coupling between telescoped ends of conduits while accounting for an effective sealing of the conduits.

In the course of manufacture of automatic washing machines, it is standard practice in the final stage to test the washing machine from the standpoint of operation of the conventional Dole valve and the timing means in the machine. This is usually accomplished by connecting hot and cold water lines in the factory to the respective hot and cold conduits of the Dole valve. In the past, this has been a tedious operation, and fluid-tight connections have been afforded only with considerable difficulty and at considerable time and expense. The primary object of the present invention is to materially expedite testing operations of the kind described above, and to accomplish this by way of a portable coupling device which can be conveniently held in the hand and operated manually for establishing desired connections of the foregoing kind in a fluid-tight relationship.

Specifically, it is an object of the present invention to construct a portable and manually operable coupling device embodying a stationary conduit having one end connected to an on-off valve and having the other end thereof provided with a flange or shoulder beneath which is located a compressible O-ring. Further, the unit embodies a slide head having a clamping element associated therewith which is coaxial with the aforesaid stationary conduit, and the coupling element includes a shoulder disposed beneath the O-ring such that by moving the slide head toward the O-ring the latter is eventually compressed between the shoulders and bulged to afford a seal for a conduit telescoped over the first-named conduit. In the specific form of the invention herein illustrated, a dual arrangement is afforded so that multiple connections and seals can be established simultaneously, and such constitutes another specific object of the present invention. Another object of the present invention is to grip the conduits to which connections are to be made.

Other and further objects of the present invention will be apparent from the following description and claims and are illustrated in the accompanying drawings which, by way of illustration, show a preferred embodiment of the present invention and the principle thereof and what is now considered to be the best mode contemplated for applying this principle. Other embodiments of the invention embodying the same or equivalent principle may be used and structural changes may be made as desired by those skilled in the art without departing from the present invention.

In the drawings:

FIG. 1 is an elevation of a unit constructed in accordance with the present invention, certain parts being broken away to show sections;

FIG. 2 is a detail sectional view of the released condition of certain parts shown in section in FIG. 1;

FIGS. 3 and 4 are sectional views taken substantially and respectively on the lines 3—3 and 4—4 of FIG. 1;

FIG. 5 is a detail sectional view on an enlarged scale showing the internal sealing of a Dole valve conduit in accordance with the present invention;

FIG. 6 is a detail view illustrating the released state of the slide head; and

FIG. 7 is a plan view of the clamping head partly broken away.

The present invention is illustrated in FIG. 1 as embodied in a coupler unit 10 which in the present instance is arranged to enable hot and cold water supply lines to be expeditiously coupled in a fluid-tight manner to corresponding conduits that are an integral part of a standard Dole valve of an automatic washing machine. This enables the washing machine, in its final stage of manufacture, to be tested under actual operating conditions insofar as the Dole valve and timing devices in the washing machine may be concerned. To this end, the test device 10 includes a pair of standard ball valve units 14 and 15 having capped inlets 16 and 17 which are respectively adapted to be joined to the aforementioned hot and cold water lines. The ball valves 14 and 15 include respective operating handles 20 and 21 enabling these valves to be opened and closed selectively as desired.

A pair of conduits 25 and 26 are provided with threaded ends 27 and 28 which are threadedly joined to the valve units 14 and 15 in the usual fashion, so as to afford a rigid fluid-tight connection therebetween. The upper portions of the conduits 25 and 26 are reduced in diameter at 30, and these reduced diameter portions of the conduits 25 and 26 are tightly clamped in a mounting head 35, FIG. 7, as will now be described.

Thus, as shown in FIG. 7, the mounting head 35 includes what in effect is a split casting of two sections 35A and 35B which are adapted to be rigidly joined one to the other by studs 38. The mounting head 35 is rectangular in its outer dimensions, and the two sections are joined along an angled parting line 39. The sections 35A and 35B are complementally machined or otherwise formed, with mateable arcuate recesses communicating with the parting line 39, so that when fitted together there is afforded three completed 360° apertures 40, 41 and 42 aligned along the horizontal portion of the parting line 39, as viewed in FIG. 7.

The outer apertures 40 and 42 are sized to receive the reduced diameter portions 30 of the conduits 25 and 26 so that these conduits 25 and 26, when disposed in the mounting head 35 after the sections 35A and 35B have been fitted thereabout, will be maintained in spaced relationship, as shown in FIG. 1. The studs 38 will thereafter be turned in the tapped openings provided therefor in the sections 35A and 35B so as to tightly clamp the conduits 25 and 26 stationarily in place. It should also be pointed out that the outer sides of the sections 35A and 35B are machined to afford sloped surfaces 44, FIGS. 1 and 7, for a purpose to be described hereinafter, these sloped surfaces being located at the medial areas of the outer sides of the sections 35A and 35B. The sloped surfaces 44 are so located that when the mounting head 35 is properly associated with the conduits 25 and 26, the sloped surfaces will face toward the valves 14 and 15, as will be apparent in FIG. 1.

The present unit is adapted to enable a fluid-tight connection to be established between the free ends of the conduits 25 and 26 and the related conduits (not shown in FIG. 1) which lead to the Dole valve of the automatic washing machine which is to be tested after interposing the unit 10. In achieving this, the free ends of the conduits 25 and 26, that is, the ends opposite the threaded ends 27 and 28 are provided with outwardly directed annular shoulders 51 and 52 which are of larger diameter than the reduced portions 30. O-rings 54 and 55 are disposed concentric about the reduced portions 30 of the conduits 25 and 26 beneath the respective shoulders 51 and 52. Referring to FIG. 5, a Dole valve conduit DC is shown as telescoped down over the shouldered end of the conduit 25 and the O-ring 54, and in operation the second Dole valve conduit will be concurrently telescoped down over the shouldered end of conduit 26 and its O-ring 55. The Dole valve conduits thus communicate with the conduits 25 and 26 and are to be sealed internally by the O-rings 54 and 55 in a manner to be explained. In accomplishing this, a slide head 60 is afforded having clamping elements in the form of shoulders adapted to move axially toward and away from the O-rings 54 and 55 such that when the clamping elements are effective to engage the O-rings, these are compressed and bulged radially as shown in FIGS. 1, 4 and 5 to establish an internal seal within the two conduits as DC connected to the related Dole valve.

Thus, as shown in FIGS. 1, 4 and 6, the slide head 60 of rectangular shape and dimension is disposed above the mounting head 35 in horizontal parallel relation. A pair of spaced apertures 61 are formed through the slide head 60, and these apertures are located so as to be co-axial with the reduced portions of the conduits 25 and 26 clamped in the mounting head 35. Mounted in each such aperture 61 in the slide head 60 is a two-piece split sleeve 62 and 63. Each stub sleeve affords an annular boss 65 which has a slip fit in the corresponding slide head aperture 61, and these bosses are provided with enlarged annular flanges 66 having lower surfaces engaging the top side of the slide head 60, as shown in FIGS. 1, 4 and 6. The flanges 66 are spaced from the free upper ends of the bosses 65, and resultantly, the stub sleeves 62 and 63 include respective annular shoulders 68 which are of approximately the same diameter as the related shoulders 51 and 52 of the conduits 25 and 26. Such dimensioning enables the related Dole valve conduit as DC to be telescoped over the related shoulder 68 as shown in FIG. 5 with the free end of the conduit DC reposing on the flange 66 of the clamping element.

The internal diameter of the clamping element sleeves 62 and 63 is such that these sleeves are free to slide axially relative to the conduits 25 and 26 which are stationarily clamped in the mounting head 35, and inasmuch as the O-rings are positioned between the shoulders at the free ends of the conduits 25 and 26 and the shoulders of the clamping sleeve elements 62 and 63 carried by the slide head, it will be realized that by moving the slide head axially toward the O-rings 54 and 55, there will be eventual compression of the O-rings between these shoulders, and this is the state of the device 10 illustrated in FIGS. 1, 4 and 5.

Cam means are utilized to so move the slide head axially toward the shouldered ends of the conduits 25 and 26, and the arrangement is such that slide head movement occurs against the return action of a yieldable means in the form of coil springs 70 having the ends thereof anchored on studs 71 and 72 respectively affixed to the slide head and the mounting head. Advantageously, these return springs can be located in a recessed relation between the heads. During its sliding movement, the slide head is, of course, guided by clamping elements 62 and 63 which concentrically surround the reduced portions 30 of the stationary conduits 25 and 26. The slide head is also guided by a boss 75 which additionally serves as a cam follower. The boss 75 has an enlarged head disposed freely in the central opening 41 in the mounting head 35, and additionally includes a stub portion 76, FIG. 6, which has a press fit in an opening formed in the slide head at the geometrical center thereof between the clamping elements 62 and 63. The lower end portion 75A, FIG. 6, of the enlarged head of the boss 75 normally projects below the bottom face of the mounting head 35 as a cam follower in position to be engaged by the cam element 77C of a cam arm 77. The released position of the slide head 60 is illustrated in FIG. 6 wherein the low part of the cam element 77C engages the follower surface 75A. In this state of the device 10, the shoulders on the clamping elements are sufficiently spaced from the shoulders on the conduits 25 and 26 to allow the O-rings to assume their normal uncompressed state, as shown in FIG. 6, and the return springs 70 are substantially untensioned.

A pair of clamp arms are pivotally mounted at the sides of one of the mounting and slide head members, and in the present instance it is the slide head on which these arms are pivotally mounted. Means are afforded, as will be described, for causing the clamping arms to pivot toward one another incidental to movement of the slide head from its released position shown in FIG. 6 to account for the application of a holding or clamping force to the threaded ends of the two Dole valve conduits which are to be sealed internally by the O-rings 54 and 55. Thus, and referring in particular to FIGS. 1, 2 and 3, the opposite vertical sides of the slide head are in effect inwardly notched at 80 at directly opposite and aligned areas, and a pair of elongated vertically disposed clamp arms 81 and 82 are disposed in these recesses and are pivotally secured to the clamp head by dowel pins 83. Coil springs 85 are mounted in aligned sockets in the adjacent faces of the slide head and the clamp arms and these coil springs normally tend to apply clockwise turning moment to the arm 82, as viewed in FIG. 1.

The clamp arms 81 and 82 are thus connected to the slide head so as to move therewith, and the lower ends of these clamp arms are provided with inwardly directed toes T, FIG. 2, each of which has a sloped inner surface 88 which is sloped complemental to the related one of the sloped surfaces 44 mentioned above as provided at the opposite sides of the clamp head 35. FIG. 2 also illustrates the released state of the device 10 wherein the above described cam follower carried by the slide head is on the low part of the cam 77C, and in this state of the device the toes T of the clamp arms 81 and 82 are below the sloped surfaces 44 of the clamp head 35 whereby the sloped surfaces 88 of the clamp arms are disengaged from the vertical side walls of the clamp head. In this condition, the coil springs 85 are effective to pivot the clamp arms 81 and 82 outwardly about the dowel pins 83 thereby exposing the shouldered ends of the conduits 25 and 26 to enable the Dole valve conduits to be easily telescoped thereover.

Each clamp arm 81 and 82 is provided at the upper end thereof with a clamp shoe 90 removably secured thereto by a stud 91. The clamp shoes or brackets 90 project from the inner sides of the clamp arms 81 and 82 in the direction of the shouldered ends of the conduits 25 and 26, and the inner faces of the clamp shoes 90 are formed with threads and have an arcuate configuration 94, FIGS. 1 and 2, so as to be capable of complementally engaging the adjacent threaded end of the Dole valve conduit as DC to apply a clamping or holding force thereto which prevents movement of the Dole valve conduits when water pressure is later applied.

The cam arm 77 is mounted for pivotal movement between the valves 14 and 15 and their associated conduits 25 and 26. To this end, a mounting bracket as afforded by a pair of spaced arms 94 and 95, FIGS. 1 and 3, is secured by studs 96 to the under side of the mounting head with the arms 94 and 95 disposed in parallel vertical planes. The adjacent inner vertical sides of the arms 94 and 95 are spaced apart one from the other sufficiently to allow the cam arm 77 to be disposed therebetween. The cam arm 77 is pivoted with an aperture 77A, FIGS. 4 and 6, and this aperture is aligned with openings in the bracket arms 94 and 95 in which a journal pin 97 is disposed, the relationship being such that this journal pin is passed through the aperture 77A in the cam arm and has the opposite ends thereof reposed in such openings in the bracket arms enabling the cam arm 77 to be pivoted thereon.

The coupling device 10 is adapted to be conveniently held by the user, and in use is manipulated so that the Dole valve conduits will be co-axially aligned with the conduits 25 and 26. At this stage of operation, it will be appreciated that the cam arm 77 is disposed in the position shown in FIG. 6 wherein the slide head is in its released position and wherein the clamping arms 81 and 82 are in their outward positions, as shown in FIG. 2, exposing the shouldered ends of the conduits 25 and 26. The unit 10 is then moved so that the ends of the Dole valve conduits are telescoped over the shouldered ends of the conduits 25 and 26 with the ends of the Dole valve conduits reposed on the shoulders 66 of the clamping elements carried by the slide head. Once this initial association has been accomplished, the cam arm 77 is then rotated counterclockwise, as viewed in FIG. 6, to the actuated position shown in FIG. 4, and during this motion of the cam arm 77 the high part of the cam element 77C gradually moves the boss or cam follower 75 axially away from the clamping head 35 against the action of spring 70. These movements are accompanied by inward pivotal movement of the clamp arms 81 and 82, inasmuch as the sloped surfaces 88 will be moving upwardly along and cammed by the related sloped surfaces 84 of the clamping head causing compression of the coil spring 85. When the toes T of the arms 81 and 82 ride on to the vertical sides of the clamping head 35, the arms 81 and 82 will be stationary, and consequently, the arcuate threaded surfaces 94 of the clamping shoes firmly engage the threaded outer diameters of the Dole valve conduits producing stabilization of the latter. In the meantime, the shoulders 68 of the clamping devices 62 and 63 eventually encounter and compress the O-rings on the shoulders 51 and 52 of the conduits 25 and 26. This results in radial outward bulging of the O-rings in contact with the internal diameters of the Dole valve conduits, producing the desired internal sealing thereof so that there will be no leaks when the ball valves 14 and 15 are opened to direct water through the conduits 25 and 26 and the Dole valve conduits that have been telescoped over the shouldered ends of the conduits 25 and 26.

From the foregoing it will be seen that under the present invention, I have enabled fluid-tight connections to be easily and quickly established between conduits, and this is particularly advantageous in the instance of factory testing of automatic washing machine operation. Hence, while I have illustrated and described a preferred embodiment of my invention, it is to be understood that this is capable of variation and modification.

I claim:

1. In a device of the kind described for joining two conduits in a fluid-tight relation, means affording a support member for one of said conduits with said one conduit stationarily mounted therein, said one conduit having a free end with an annular shoulder thereon projecting beyond said support and capable of telescoping into the open end of the other conduit, a slide head member mounted freely about said one conduit for axial movement toward and away from said shoulder, a clamping element carried by said slide head member and having an annular shoulder formed thereon which is spaced axially from and approximately the same diameter as the first-named shoulder, a compressible O-ring mounted about said one conduit and between said shoulders, spring means for biasing the slide head member to a released position wherein said shoulders are spaced sufficiently from one another to enable the O-ring to assume an uncompressed state and in which state the free end of the other conduit is to be telescoped over both said shoulders, a cam arm having the cam element thereof engageable with a part of said slide head member to move the slide head axially toward the shoulder on said one conduit to compress the O-ring, a clamp arm pivotally mounted on said slide head member and having a threaded surface for engaging the other conduit, and means for moving said clamp arm into contact with the other conduit during axial movement of said slide head toward the shoulder on said one conduit including a sloped surface on said support member.

2. In a device of the kind described for joining conduits in a fluid-tight relation, a two-part mounting head member having a pair of side-by-side conduits tightly clamped therein, said conduits each having an annular shoulder at the free end thereof projected beyond said mounting head and adapted to have a related pair of other conduits telescoped thereover, said other conduits having threaded exterior surfaces, said clamped conduits at the other ends thereof being connected to respective on-off valves, a slide head member having a pair of clamping elements with apertures therein in which said conduits are freely disposed co-axially enabling the slide head member and the clamping elements simultaneously to move axially toward and away from said shoulders, spring means acting between the mounting head member and the slide head member and normally biasing the slide head member to a released position, said clamping elements carried by said slide head member each having an annular shoulder spaced axially from the corresponding shoulder on a related one of said conduits, compressible O-rings to be arranged between the shoulders of said clamped conduits and the shoulders of said clamping elements, the shoulders of said clamping elements being approximately the same diameter as the shoulders of said clamped conduits whereby said other pair of related conduits can be telescoped over said O-rings to dispose the O-rings internally of said other conduits, a cam follower located at a centered position on said slide head member and extended freely through an aperture in said mounting head, a manually operable cam arm having a cam engageable with the extended portion of said follower to move the slide head member and its clamping elements axially toward the shoulders on said clamped conduits causing simultaneous compression of said O-rings and sealing engagement of the O-rings internally of said other conduits telescoped over the O-rings as aforesaid, a pair of clamping arms pivotally mounted on said slide head member for engaging the sides of said other conduits, said clamp arms having threaded portions and cooperative means on said mounting head and clamping members for engaging the threaded portions of the clamping arms with the threaded exterior surfaces of the other conduits upon axial movement of said slide head toward the shoulders on said clamped conduits.

References Cited in the file of this patent

UNITED STATES PATENTS

| 1,163,364 | Pedersen | Dec. 7, 1915 |
| 1,340,785 | McMullin | May 18, 1920 |
| 1,916,284 | Ragan | July 4, 1933 |
| 2,482,175 | Hamilton | Sept. 20, 1949 |
| 2,593,454 | Hyser | Apr. 22, 1952 |
| 2,648,348 | Robinson | Aug. 11, 1953 |
| 2,708,588 | Prah | May 17, 1955 |
| 2,788,991 | Neuhauser | Apr. 16, 1957 |

FOREIGN PATENTS

| 3,044 | Great Britain | Feb. 12, 1895 |
| 831,779 | France | June 13, 1938 |
| 142,620 | Australia | July 30, 1951 |

UNITED STATES PATENT OFFICE

CERTIFICATION OF CORRECTION

Patent No. 3,011,805                                  December 5, 1961

Edwin H. Johnson

It is hereby certified that error appears in the above numbered patent requiring correction and that the said Letters Patent should read as corrected below.

In the grant, lines 2 and 12, and in the heading to the printed specification, lines 4 and 5, name of assignee, for "Landor Incorporated", each occurrence, read -- Jandor Incorporated --.

Signed and sealed this 24th day of April 1962.

(SEAL)
Attest:

ESTON G. JOHNSON
Attesting Officer

DAVID L. LADD
Commissioner of Patents